United States Patent
Lang

(10) Patent No.: US 10,417,308 B2
(45) Date of Patent: *Sep. 17, 2019

(54) COMMENTING DYNAMIC CONTENT

(71) Applicant: ADOBE INC., San Jose, CA (US)

(72) Inventor: Grayson Squier Lang, Palo Alto, CA (US)

(73) Assignee: ADOBE INC., San Jose, CA (US)

( * ) Notice: Subject to any disclaimer, the term of this patent is extended or adjusted under 35 U.S.C. 154(b) by 339 days.

This patent is subject to a terminal disclaimer.

(21) Appl. No.: 14/857,299

(22) Filed: Sep. 17, 2015

(65) Prior Publication Data

US 2016/0004671 A1    Jan. 7, 2016

Related U.S. Application Data

(63) Continuation of application No. 11/862,645, filed on Sep. 27, 2007, now Pat. No. 9,170,997.

(51) Int. Cl.
*G06F 17/21*   (2006.01)
*G06F 17/24*   (2006.01)
*G06F 16/93*   (2019.01)
*G06F 3/0482*  (2013.01)
*G06F 3/0484*  (2013.01)

(52) U.S. Cl.
CPC .......... *G06F 17/212* (2013.01); *G06F 3/0482* (2013.01); *G06F 3/04842* (2013.01); *G06F 16/93* (2019.01); *G06F 17/24* (2013.01); *G06F 17/241* (2013.01)

(58) Field of Classification Search
CPC ...... G06F 17/212; G06F 17/24; G06F 17/241; G06F 3/0482; G06F 3/04842
See application file for complete search history.

(56) References Cited

U.S. PATENT DOCUMENTS

| | | | |
|---|---|---|---|
| 5,838,313 A | 11/1998 | Hou et al. | |
| 6,871,318 B1 * | 3/2005 | Wynblatt | G06Q 10/10 715/201 |
| 7,082,454 B1 * | 7/2006 | Gheith | G06F 17/30902 707/999.01 |
| 7,418,656 B1 | 8/2008 | Petersen | |
| 7,559,017 B2 | 7/2009 | Datar et al. | |

(Continued)

OTHER PUBLICATIONS

Abowd, Gregory, et al., "Anchoring Discussions in Lecture: An Approach to Collaboratively Extending Classroom Digital Media", Computer Support for Collaborative Learning, (1999), pp. 11-19.

(Continued)

*Primary Examiner* — Manglesh M Patel
*Assistant Examiner* — Nicholas Hasty
(74) *Attorney, Agent, or Firm* — Shook, Hardy & Bacon LLP

(57) ABSTRACT

A method for adding comments to dynamic content is provided. The method may include receiving an indication to associate a comment with a comment state of a scripted dynamic content. The comment state may include a user-customized content element. In response to receiving the indication to associate the comment with the comment state, opaque state information for the comment state may be requested. The opaque state information may be useable to render the comment state. The comment may be stored in association with the opaque state information for the comment state.

20 Claims, 7 Drawing Sheets

(56) References Cited

U.S. PATENT DOCUMENTS

| | | | |
|---|---|---|---|
| 7,734,610 | B2 | 6/2010 | Rakowski et al. |
| 7,735,101 | B2 | 6/2010 | Lanza et al. |
| 2003/0120719 | A1* | 6/2003 | Yepishin ............ G06F 17/30899 709/203 |
| 2004/0148638 | A1 | 7/2004 | Weisman et al. |
| 2004/0230906 | A1 | 11/2004 | Pik et al. |
| 2004/0243928 | A1 | 12/2004 | Hesmer et al. |
| 2006/0206501 | A1 | 9/2006 | MacLaurin |
| 2006/0282776 | A1 | 12/2006 | Farmer et al. |
| 2007/0079321 | A1 | 4/2007 | Ott |
| 2007/0266011 | A1 | 11/2007 | Rohrs et al. |
| 2008/0250320 | A1 | 10/2008 | Channell et al. |
| 2008/0292213 | A1 | 11/2008 | Chau |
| 2008/0313206 | A1 | 12/2008 | Kordun et al. |
| 2009/0076834 | A1 | 3/2009 | Rauber et al. |
| 2009/0307201 | A1 | 12/2009 | Dunning et al. |
| 2010/0278453 | A1* | 11/2010 | King ....................... G06Q 10/10 382/321 |
| 2014/0033016 | A1* | 1/2014 | Perelman .............. G06F 17/243 715/234 |

OTHER PUBLICATIONS

Chiu, Patrick, et al., "LiteMinutes: An Internet-Based System for Multimedia Meeting Minutes", FX Palo Alto Laboratory, <URL:http://www.fxpal.xerox.com/>, 3400 Hillview Ave., Bldg. 4, Palo Alto, CA 94304 USA {chiu, johnb, andreasg, kimber}@pal.xerox.com, Copyright May 2-5, 2001, Hong Kong, pp. 140-149.

Costa, Miguel, et al., "Annotations as Multiple Perspectives of Video Content", Multimedia '02 Dec. 1-6, 2002, Juan-les-Pins, France. Copyright 2002 ACM 1-58113-620-X/02/0012, pp. 283-286.

Geyer, Werner, et al., "A Team Collaboration Space Supporting Capture and Access of Virtual Meetings", pp. 188-196.

Wilcox, Lynn, et al., "Annotation and Segmentation for Multimedia Indexing and Retrieval", FX Palo Alto Laboratory <URL:[wilcox.johnmb]@pal.xerox.com>, 1060-3425198 $10.00 (C) 1998 IEEE, 8 pages.

Non-Final Office Action dated Sep. 16, 2010 in U.S. Appl. No. 11/862,645, 14 pages.

Final Office Action dated Jan. 24, 2011 in U.S. Appl. No. 11/862,645, 14 pages.

Non-Final Office Action dated Aug. 2, 2012 in U.S. Appl. No. 11/862,645, 19 pages.

Final Office Action dated Dec. 6, 2012 in U.S. Appl. No. 11/862,645, 21 pages.

Non-Final Office Action dated Aug. 15, 2014 in U.S. Appl. No. 11/862,645, 20 pages.

Final Office Action dated Mar. 12, 2015 in U.S. Appl. No. 11/862,645, 22 pages.

Notice of Allowance dated Jun. 15, 2015 in U.S. Appl. No. 11/862,645, 18 pages.

* cited by examiner

COMMENTING DYNAMIC CONTENT

CROSS-REFERENCE TO RELATED APPLICATIONS

This application is a continuation of U.S. application Ser. No. 11/862,645, filed Sep. 27, 2007, entitled "Commenting Dynamic Content," the benefit of priority of which is hereby claimed, and which is incorporated by reference herein in its entirety.

BACKGROUND

In many fields of endeavor, the content of electronic documents is viewed and reviewed. The content includes text, drawings, audio recordings, video recordings, multimedia presentations, and the like. Such content may be divided into static content, and dynamic content. Both types of content may be viewed as a matter of entertainment, or perhaps with the objective of verifying the quality and completeness of the electronic document.

BRIEF DESCRIPTION OF DRAWINGS

Some embodiments are illustrated by way of example and not limitation in the figures of the accompanying drawings in which.

DETAILED DESCRIPTION

Introduction

Figure 1A:
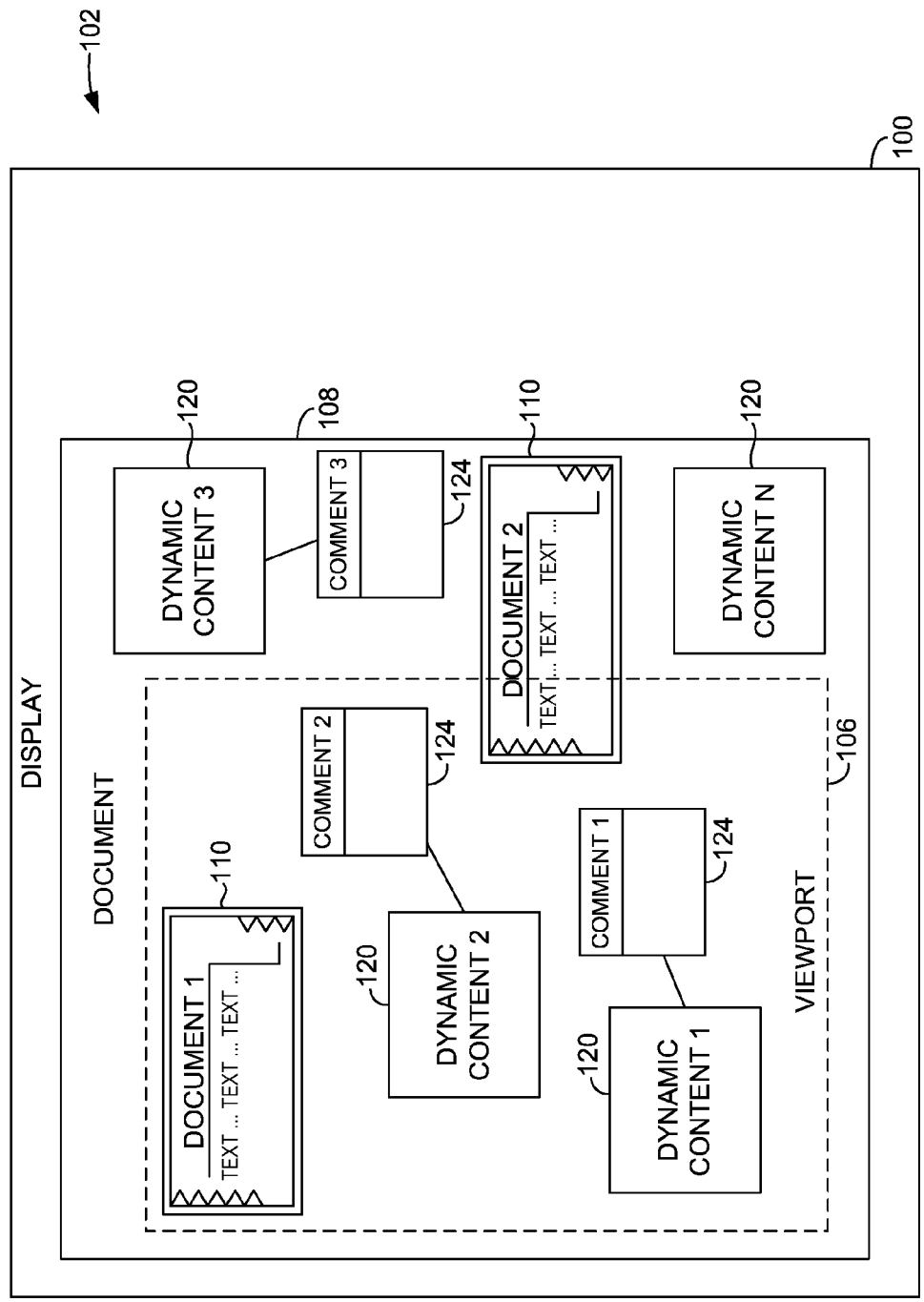
FIGS. 1A-1B illustrate document rendering on a display, according to various embodiments.

Adding comments to electronic documents that include dynamic content may present challenges to a user. For example, if an ADOBE® ACROBAT® document includes dynamic content, such as an ADOBE® FLASH® movie that interactively constructs an automobile according to the indications provided by a person interacting with the movie, the addition of a comment that captures the state of the dynamic content at the instant when a red sedan appears may be desirable. In this type of scripted content, this particular configuration of the automobile can normally only be recreated by displaying the movie and interacting with it until the corresponding comment state is achieved. However, this state may be lost each time the movie is rendered anew (e.g., the document containing it is opened), so that any comments intended for attachment to the comment state are likely without meaning.

An embodiment proposes that opaque state information may be received from, and sent to a rendering program used to render the movie. This opaque state information may be requested and used to capture the state of the dynamic content at a particular juncture (e.g., when the red sedan with four doors and a convertible top is shown). It may then be stored, along with a comment by a reviewer, in an electronic document data file. At a later time, the opaque state information may be retrieved, sent to the rendering program, and the state of the dynamic content may then be recreated as intended by the user, in conjunction with the attached comment.

The opaque state information is "opaque" in the sense that the requesting program does not need to recognize the format or individual values of the information it receives. For example, the opaque state information may simply comprise a stream of numbers that are passed back and forth between the requesting program and the script. The requesting program does not know or care what values are included in the information, or how the information is formatted. In some embodiments, this information comprises eXtensible Markup Language (XML).

Example embodiments may work with many types of dynamic content, including scripted dynamic content. An example of such scripted dynamic content includes SHOCKWAVE® FLASH® object files that can be executed or played using the ADOBE® FLASH® Player 9 runtime software application, available from Adobe, Inc. of San Jose, Calif. This type of scripting enables complex user interaction with the object file. A script engine may be driven by the ACTIONSCRIPT™ scripting language, which responds to events while storing state terms internally in memory. Essentially, the file may operate as a video state machine that can enter arbitrary states, depending on historical user interaction.

By requesting the opaque state information from a scripting engine and storing it with or within a document, the state of the dynamic content can be recreated at the point where the opaque state information was originally requested. In this case, an interface can be created that submits a query requesting the state information from the script at a particular instant in time. In response, the interface may receive an opaque block of data from the dynamic content or the rendering program associated with the dynamic content.

In some embodiments, the opaque state information is saved along with a user comment directed to the state which is to be recreated. At a later time, when the comment is retrieved, perhaps by another user, the opaque state information is also retrieved and used to recreate the state of the dynamic content.

For example, referring again to the example of SHOCKWAVE® FLASH® object files, the script can be written to respond to a function call from an interface that runs out of a rendering module (e.g., the interface can be created to run out of ADOBE® READER® software). The opaque state information can be stored with or within a comment, and when the comment is re-activated, the opaque state information can be sent to the script so that the comment state can be recreated.

For the purposes of this specification, the term "dynamic content" means any electronic media content that can change state over time, and it may include scripted dynamic content (which depends on a script and interaction with other entities, such as users, to enter into arbitrary states), and non-scripted dynamic content. An example of scripted dynamic content includes the Shockwave® Flash® object files mentioned previously. The generation of scripted dynamic content is also supported by the MICROSOFT® SILVERLIGHT™ software development platform. Examples of non-scripted dynamic content include the WAV (a subset of the MICROSOFT® Resource Interchange File Format (RIFF) specification) and MPEG-4, Version 2 (ISO/

IEC 14496-14:2003. Information technology—Coding of audio-visual objects—Part 14: MP4 File Format) file formats.

For the purposes of this specification, the term "electronic content" includes any digital data that may be presented to a user (e.g., visually or audibly presented), such as an electronic document, page-descriptive electronic content such as a page-descriptive electronic document, media stream, web page, hypertext document, image, digital video or video recording, digital audio or audio recording, an animation, a markup language document, such as for example a hypertext markup language (HTML) or XML document, a form having components to be filled in, or data describing the application of a graphical user interface.

A "content element" shall include any part or share of electronic content that is defined or discernable as a part or share. For example, a content element may be automatically discerned from a characteristic of the content element itself (e.g., a paragraph of an electronic document, or a file format designation) or may be manually defined by a user (e.g., a user-selected collection of words in an electronic document, a user-selected portion of a digital image). Examples of content elements include portions of a page-descriptive document or other electronic document, such as, for example, pieces of electronic text or other material within the electronic document, dynamic content in the form of portions of media streams such as sections of digital video or frames or sets of frames of digital video or digital audio, dynamic content in the form of segments or frames of animations, electronic forms, form templates, form elements, form data, actuatable element specifications or executable instructions, and various elements presentable or accessible by users within electronic content, including instances of scripted and non-scripted dynamic content and the like.

Content elements may be associated with empty content, for example an electronic document may include a blank page; the content of the blank page, namely any data indicating its blankness, may in some embodiments be considered as a content element, namely an empty content element. Content elements may include format data such as, for example, position information describing the placement of other content elements, or information specifying colors or fonts to be used in rendering other content elements.

For the purposes of this specification, a content item may be "associated" with electronic content. Examples of such association comprise inclusion within a file or other data structure containing the electronic content, the presence of a direct or indirect reference to the content element within electronic content, or the presence of a data structure, file, or other mechanism by which a content element is associated with electronic content. The association of a content element with electronic content does not necessarily require that when the electronic content is presented (or otherwise made accessible to a user or as input to a machine), that the content element is, in the course of presentation or access, also presented or made accessible. Content elements may be hidden from a user due to the location of a viewport, for example.

In considering the association between electronic content and an associated content element, the term "literally included" may be used. In this specification, electronic content may, for example, literally include a content item if the data structure that contains the data that largely describes the electronic content includes the data that largely describe the content element. In some embodiments, a content element may be associated with electronic content by reference, wherein the data that describes the content element is not directly contained within or integral with the data that describes the electronic content with which the element is associated.

For the purposes of this specification, the term "rendering" used as a verb includes presenting or making accessible electronic content or content elements to be perceived, viewed, or otherwise experienced by a user, or be made available for further processing, such as, for example, searching, digesting, printing, analyzing, distilling, or transforming by computational processes that may not include processing the intrinsic data structure describing the electronic content or content element. Whether a content element associated with electronic content is included in the rendering of the electronic content may, by default, be determined by whether or not the content element is active.

For the purposes of this specification, the term "rendering" used as a noun includes human-perceivable representations of data that is within a machine and perception-specialized organizations of data defining such representations. For example, a rendering may include a pattern of human-perceivable matter or energy presented on an output device (e.g., display) by a machine, as well as the organization of data within a machine that defines such patterns. For example, such organizations of data may include the electronic configuration of a memory used by a graphics display processor, or a file containing an audio segment suitable for playing via an audio system of a computer.

For the purposes of this specification, the term "rendering module" may be taken to include systems, applications, and mechanisms for rendering or presenting electronic content to a user, including the presentation of content elements such as text, graphics, form element renderings and other electronic content elements. An example of a rendering module includes a web browser component (e.g., Microsoft Internet Explorer) or other component to render electronic content such as HTML pages. Another example of a rendering module includes the ADOBE® ACROBAT® electronic publishing program.

For the purposes of this specification, the term "rendering program" includes applications for rendering or presenting dynamic content to a user. An example of a rendering program is the ADOBE® FLASH® Player 9 runtime software application. In many embodiments, a rendering module interacts with a rendering program to render dynamic content.

Certain applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). Modules may include hardware circuitry, optical components, single or multi-processor circuits, memory circuits, software program modules and objects, firmware, and combinations thereof, as appropriate for particular implementations of various embodiments. The term "module" includes an identifiable portion of code, data, or computational object to achieve a particular function, operation, processing, or procedure.

For the purposes of this specification, the term "portion" may be taken to include any part, component, subset, data structure, or other part included properly or improperly within electronic content.

It is common for one or more users (or other actors, such as automated processes) to view or review electronic content. In some embodiments, a review may be carried out by one person or by a team including multiple persons.

When viewing or reviewing, a user may start up an application (e.g., a rendering module) to render or otherwise present electronic content. This electronic content may take a variety of forms such as an electronic document, an audio file, video file, sequence of images, dynamic content, combinations thereof, and other forms of electronic content.

During the course of the activity, the user may be presented with a rendering of various content elements (e.g., using an output device, such as a display) included or otherwise associated with the electronic content. In some embodiments, these content elements may be presented in a sequential order so as to indicate their positions or interrelationships within the electronic content, or for ease of user perception.

Various types of content elements contained within electronic content may be presented to a user on an output device in various ways according to the nature of the content elements and/or the preferences of users. For example, electronic content representing an electronic document may be presented on a display screen in the form of renderings of pages as they might appear if the electronic document were to be printed out. In some such embodiments, the user may use a mouse, keyboard, touch pad, voice input or other input devices to explore the electronic document. The application may provide such affordances as scroll bars, fast forward/reverse scan buttons, or other graphical user interface (GUI) elements to be manipulated by the user to carry out exploration of the electronic document. This exploration may be used when the entire electronic document is too large to conveniently display on a computer screen at one time. In some embodiments, electronic content may include dynamic content, such as a video recording, a movie, a documentary, a video sample clip, animation, and other like electronic content. Such electronic content may include a number of video frames which may be rendered sequentially at sufficient speed so as to produce perception of a motion picture to the user. This may be carried out by presenting a rendering of each video frame for a fraction of a second followed by the presentation of the next video frame for a comparable fraction of a second and so forth (unless paused, stopped, or otherwise interrupted by a user) until the end of the set of frames to be presented.

In some embodiments, the electronic content may include an audio recording that may include as content elements a sequence of audio intervals. These audio intervals may be of varying lengths and depending on the application may range from less than a second in length to some arbitrary large length. During a review of such an audio recording, the rendering of an audio segment may be taken to include the playing of some or all of the audio segments through an audio output device attached to a computer that includes the rendering module.

In some embodiments, electronic content may include a set of one or more pictures or other images as part of a set of images. Thus, a user may place the rendering module into a slide show mode in which each image is shown on an output device such as a computer screen for a determinable time interval before the next image is presented. In some embodiments, such an application may present a GUI on a computer screen having a larger portion for displaying an image currently rendered at full size and a smaller portion of the GUI to display miniature images (e.g. in sequence) that represent the sequence of images within the electronic content.

While viewing or reviewing electronic content that may include content elements, the user may wish to record or otherwise keep track of portions of the electronic content, such as sets of groups of content elements that the reviewer has reviewed. One way of tracking the review includes appending or adding comments to the electronic content. Such comments may be added to the electronic content, so that the comments form a portion of an electronic document. The comments may be added by themselves (e.g., merely associated with a selected location on a page), or in association with one or more selected states of dynamic content forming a portion of the electronic document.

A data structure or other representation may be maintained by the rendering module to indicate which portions of electronic content the user has reviewed. In order to carry out this process, the user interface of a reviewing application may explore the electronic content by requesting renderings of various content elements (e.g., dynamic content) until the application is displaying or has rendered the content element or a subsequence of content elements that a user wishes to indicate as having been reviewed by adding a comment.

Once the user has made this indication, the user may begin a process by which one or more content elements are presented or rendered by the application. For example, if an electronic document reviewing application is being used, a user may scroll to the first page of a portion of the electronic document that the user desires to review, indicate (e.g. via a key combination) that the user wishes to add a comment to the document, and then type in a free-form comment directed to text on a page of the document.

Comments may also be added with respect to dynamic content. The dynamic content may be rendered in a number of states, and the user may arbitrarily select one state (e.g., a "comment state") out of many to which the comment is to pertain. The selection may be made before or after the content of the comment is entered.

For example, a user wishing to review a portion of dynamic content including video information may, in some embodiments, open a video viewing application, move a graphical user interface affordance (e.g., a slider) to a position in the video representing the initial video frame to be presented, indicate that a comment is to be attached to that frame, and then click a mouse button. In so doing, the frames subsequently presented through the user may be automatically marked as commented by the application.

In considering presentations of other forms of electronic content, similar concepts are used, as described in detail above. In each case, comment state information can be requested and/or re-supplied to a script that is associated with dynamic content so that the comment state and the added comment can be recreated at a later time.

Rendering Dynamic Content With Comments

Figure 1B:
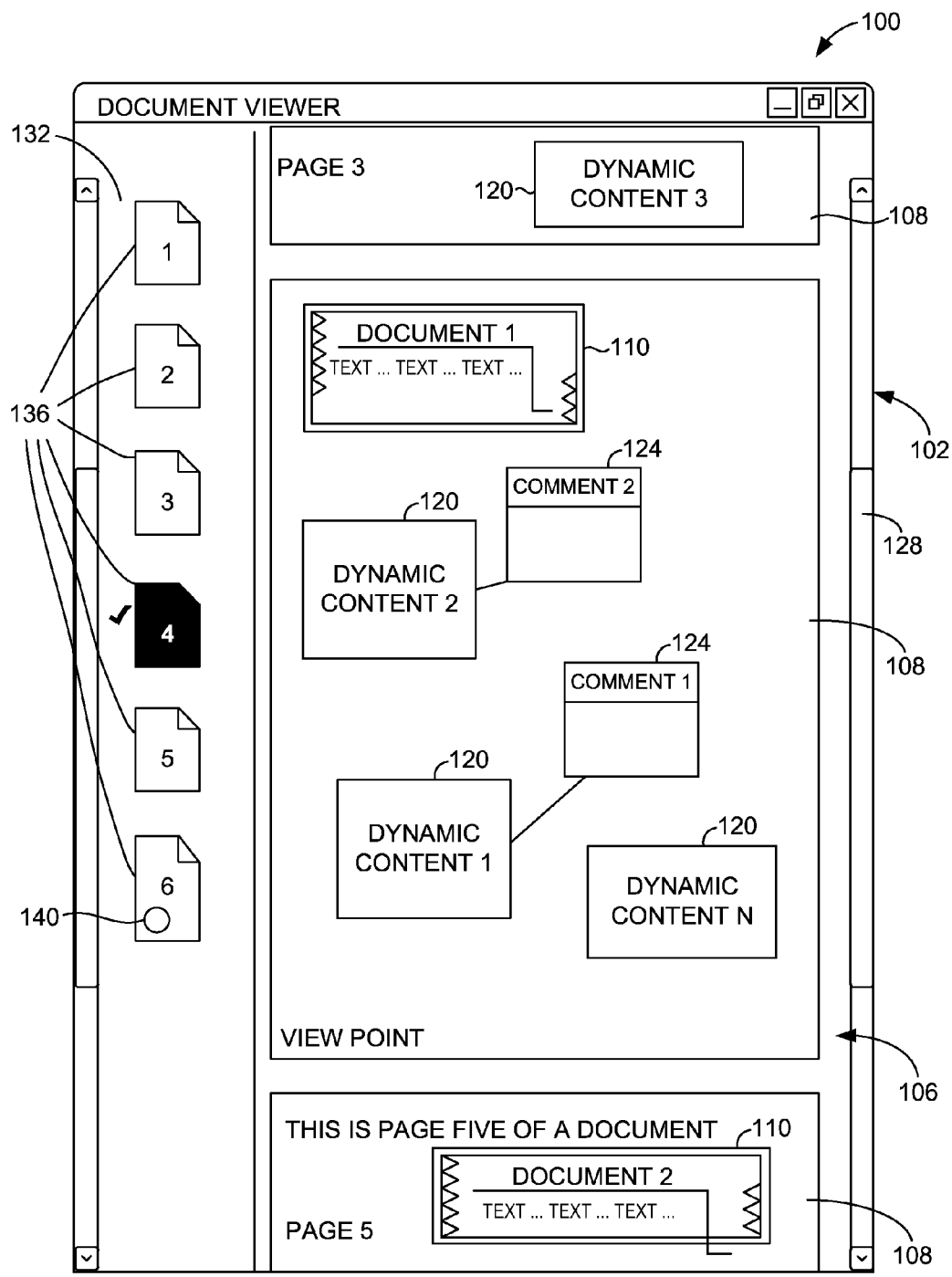

FIGS. 1A-1B illustrate document rendering on a display 100, according to various embodiments. It will be appreciated that a number of techniques may be used to present direct or indirect representations of commented dynamic content. Thus, the following paragraphs present only some of many potential embodiments that can be used in this respect.

An example GUI 102 can be presented by a reviewing application, according to one embodiment. The GUI 102 shows an example of a GUI viewport 106 window as may be presented by a reviewing application to present renderings of electronic content in the form of an electronic document 108 that includes content elements, such as other documents 110, dynamic content 120, and comments 124.

As shown in FIG. 1A, the viewport 106 permits the reviewer to see only a portion of the document 108. As shown, all of one document 110 (Document 1), and a portion of another document 110 (Document 2) are visible. Comments 124 have been added to three instances of dynamic content 120. No comment has been attached to or associated with one instance of the dynamic content 120 (Dynamic Content N). It should be noted that the location of the viewport 106 prevents viewing of one of the comments 124 (Comment 3), but permits viewing the other two comments 124 (Comment 1 and Comment 2).

As shown in FIG. 1B, the viewport 106 permits the reviewer to see only a portion of the document 108—here, all of page 4, and parts of pages 3 and 5. In this case, all of both documents 110 are visible. Comments 124 have been added to two instances of dynamic content 120 (Dynamic Content 1 and Dynamic Content 2). No comment has been attached to or associated with one instance of the dynamic content 120 (Dynamic Content 3). Here, all of the dynamic content 120 can be viewed. On the right hand side of the GUI 102, a scroll bar 128 may be provided for a user/reviewer to scroll through renderings of the various pages of the electronic document 108.

The left hand side of the GUI 102 may include a reviewing pane 132 populated by thumbnail or iconic images 136 representing various pages in the electronic document 108. These electronic document page icons 136 may in some embodiments be graphically distinguished to inform the user as to whether they include one or more comments 140 associated with dynamic content. For example, in this case, page 6 of the electronic document 108 indicates the presence of a comment 140 associated with dynamic content. In some embodiments, the comments of multiple reviewers may be illustrated within a GUI 102 presented by a reviewing application. Graphical representations 140 may be used to present comment data and may be used by groups of users to track and monitor comments that have been added to a document.

Once the particular instance of dynamic content 120, such as Dynamic Content 1 is selected by the reviewer/user, perhaps by clicking with a mouse on that item, and the user also indicates that a comment will be added, the request for opaque state information can be made.

In some embodiments, several instances of dynamic content 120 may be selected (e.g., Dynamic Content 1 and 2), and a single comment 124 may be added that references a comment state that is unique to each of the instances of dynamic content 120. In this case, the comment 124, along with the opaque state information for each instance of dynamic content 120 can be stored together, perhaps as part of the comment information in a portable document file. Thus, when another user reactivates a comment 124 to view it, then the opaque state information will be sent back to the appropriate instances of dynamic content 120 that are referenced by the information and the comment 124, so that the state of all instances of dynamic content 120 referenced by the comment 124 can be restored. More detail on how this is accomplished will be described with reference to data structures that can be used for commenting dynamic content 120, below.

Data Structures for Commenting Dynamic Content

Figure 2:
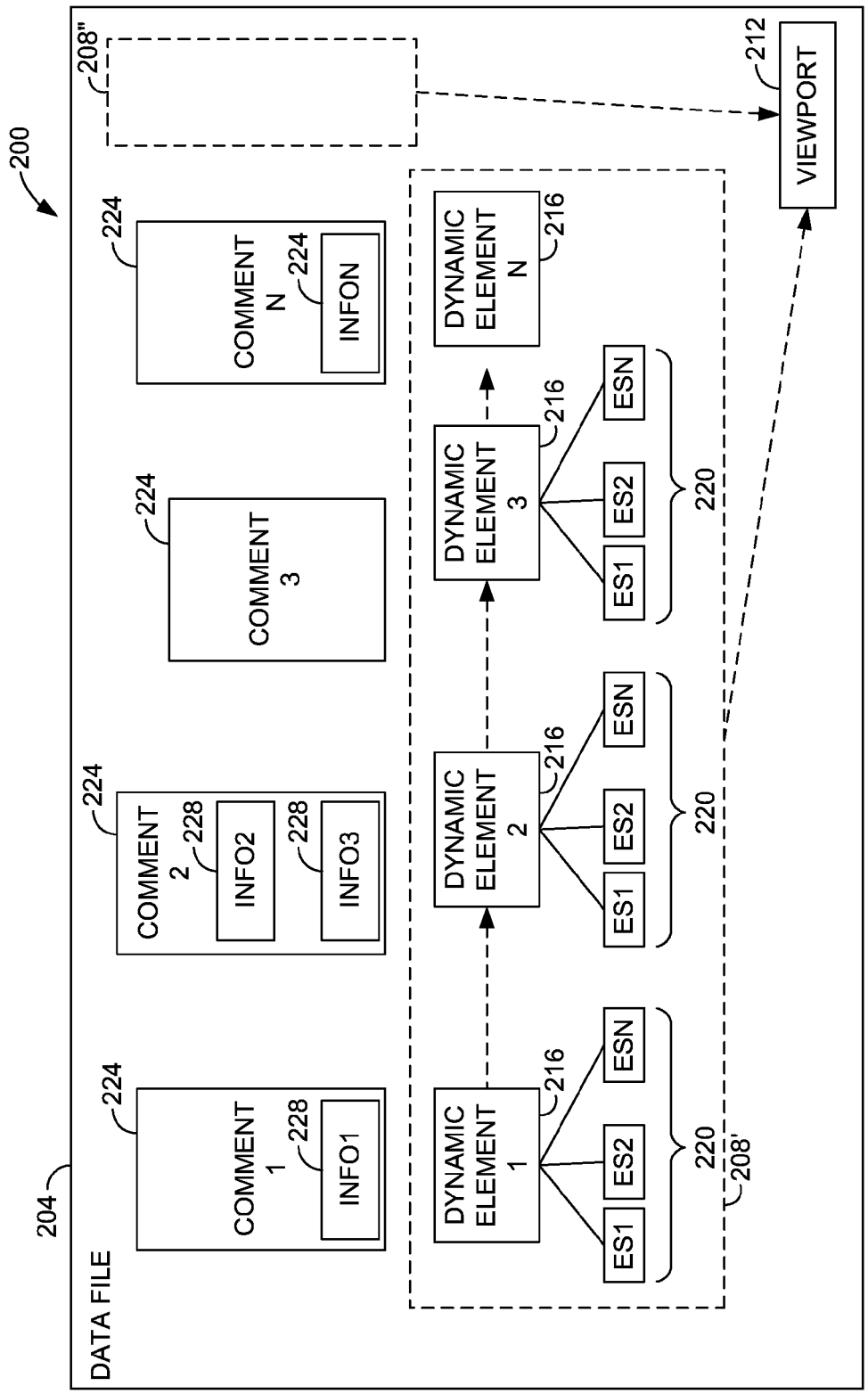
FIG. 2 is a block diagram of a data structure, according to various embodiments.

FIG. 2 is a block diagram of a data structure 200, according to various embodiments. Here it can be seen that the structure 200 comprises a data file 204 that includes one or more instances of dynamic content 208, each of which may be referenced to a viewport 212. The data file 204 may comprise a portable document format file in some embodiments. The dynamic content 208 may include various dynamic elements 216, and each element 216 may have or be associated with a number of element states 220. The dynamic content 208 can be referenced as part of a resource dictionary.

Comments 224 are also included in the data file 204. These comments 224 may be referenced to the viewport 212 and/or one or more of the instances of dynamic content 208. For example, the dynamic content 208 may comprise a SHOCKWAVE® FLASH® object file that is used to present an object of clothing that has been customized according to the taste of a particular user. The clothing dynamic content 208, in turn, has been scripted in response to user input to comprise a "dress" as Element State 2 ES2 of Content Element 1 216. Other elements states include the Element State 1 ES1 of Content Element 2 216, which is "white color" and Element State 1 ESN of Content Element 3 216, which is "bridal train". This combination of element states 220 may form the comment state associated with Comment 1 224. Thus, a user might add a comment 224 such as "This is the one I want!" to the file 204, in conjunction with the opaque state information 228 that specifies the comment state comprising Element State 2 ES2 of Content Element 1 216, Element State 1 ES1 of Content Element 2 216, and Element State 1 ESN of Content Element 3 216.

Once a user has selected the desired comment state of the dynamic content 208 (e.g., the configuration of a bridal gown), the opaque state information 228 that can be used to recreate the comment state is requested from the script file responsible for providing the dynamic content 208. As noted previously, a single comment 224 (e.g., Comment 1) can be associated with one or more comment states for multiple instances of dynamic content 208. For example, as shown, the single comment 224 Comment 2 is associated with two comment states, which can be recreated by using the opaque state information INFO2 and INFO3, corresponding to the comments states for two different instances of dynamic content 208.

At a later time, all instances of dynamic content 208 that have provided opaque state information 228 for a particular comment that is activated (e.g., viewed) by a user can be recreated by rendering them in the same comment state at which the opaque state information 228 was requested. As noted above, some or all of the comments 224, dynamic content 208, and opaque state information 228 may be referenced to a viewport 212. If the comment 224 is not visible in the viewport 212, the associated opaque state information 228 may not be retrieved, and the comment state may thus not be recreated.

Thus, many embodiments may be realized. For example, a data structure 200 may comprise one or more data files 204 including dynamic content 208. The data file 204 may be organized according to a page descriptive format. The data structure 200 may also comprise opaque state information 228 included in the data file, wherein the opaque state information 228 is associated with one or more comments 224 and a comment state selected from a plurality of states 220 associated with the dynamic content 208. The file 204 may include one or more references to a viewport 212, perhaps associated with one or more of the comments 224, opaque state information 228, and the element states of the dynamic content 208.

The dynamic content 208 may comprise scripted content and/or non-scripted content. The dynamic content 208 may comprise pure audio content, pure video content, or both. The opaque state information might comprise any number of variables, including frame information, time information, configuration information, color information, and a data analysis result (e.g., a best fit curve illustration). The data structure 200 may comprise a plurality of comment states and a corresponding plurality of instances of dynamic content 208, referenced to a viewport 212, wherein a comment (e.g., Comment 2 224) is associated with each one of the plurality of comment states that can be recreated using opaque state information INFO2, INFO3 (e.g., comment states associated with both instances of dynamic content 208', 208" shown in FIG. 2).

In some embodiments, an action of the user can be used to indicate that a review session is to begin with a particular content element (e.g., pressing Ctrl-S while viewing a rendering of the dynamic content 208') may be sufficient for the rendering module to infer that the particular content element is to be associated with a comment, such as Comment 1.

In FIG. 2, it can be seen that the comments 224 and the dynamic content 208 are literally included within electronic content, taking the form of an electronic document 202. In some embodiments, the comments 224 may be included within the same file 204 as the dynamic content 208, while in other embodiments, the comments 224 and the dynamic content 208 are contained in separate files.

Although a number of data structure details are presented above, it will be appreciated that processes and systems (e.g., rendering modules including or using various modules) described in this specification may be implemented using a variety of different data structures and data storage mechanisms. For example, in some embodiments, map-type or key/value-structured data structures may be used where the map key may be the reference to a particular user and the data associated with the key may include a list of the portions of the electronic content that have been commented by the reviewer. In some embodiments, maps may be used to combine review progress information from various users.

Methods for Commenting Dynamic Content

Methods that can be used to append comments to referenced comment states associated with dynamic content will now be described.

Figure 3:
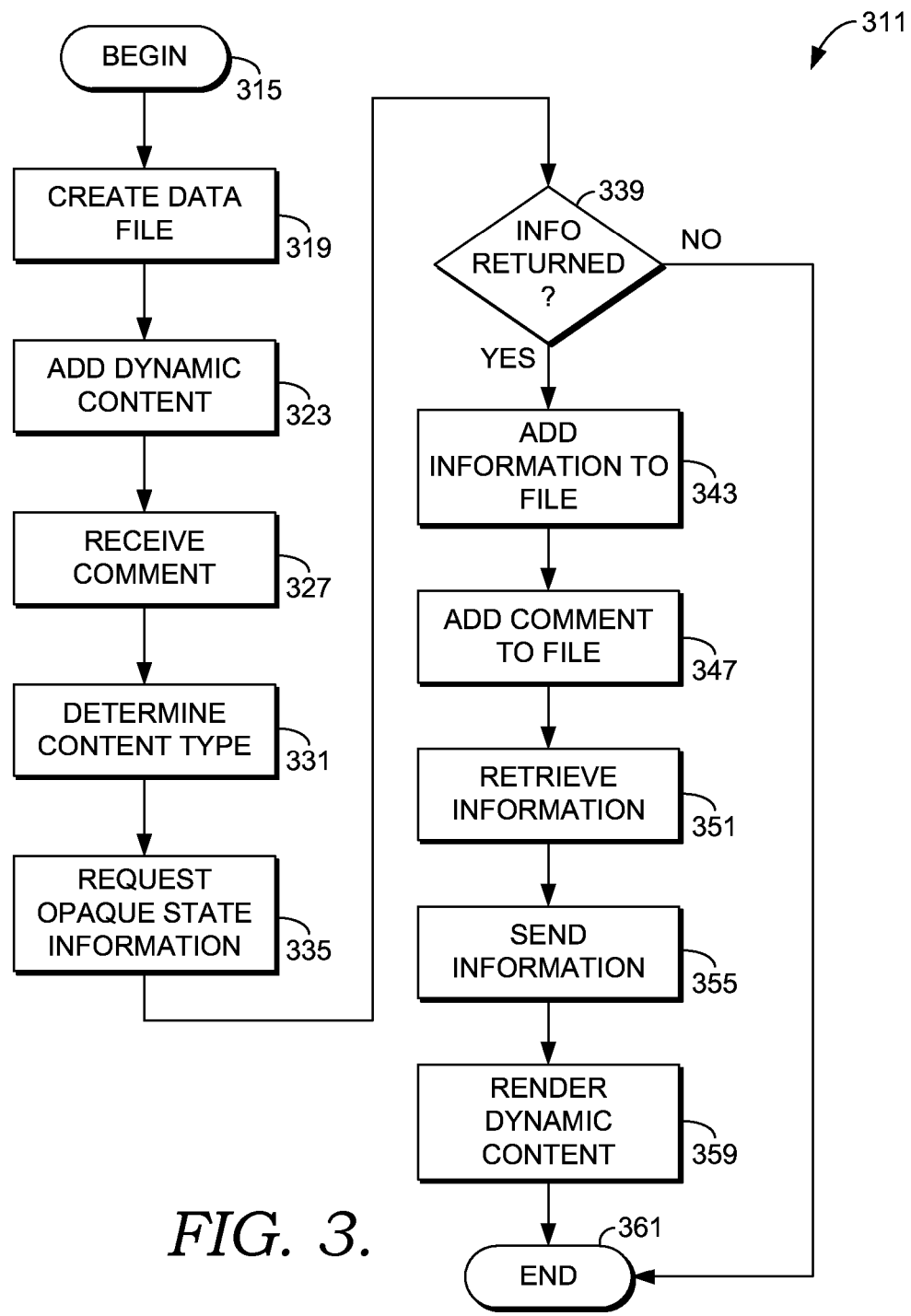
FIG. 3 is a flow diagram illustrating several methods according to various embodiments.

FIG. 3 is a flow diagram illustrating several methods 311 according to various embodiments. In some embodiments, a method 311 may begin at block 315 and go to on to block 319 with creating a data file, including a data file comprising electronic content.

The data file may be organized according to a page descriptive format and include dynamic content. The page descriptive format may comprise a portable document format, where "portable document format" means a device-independent and display resolution-independent fixed-layout document format, including the text and fonts, images, and graphic paths associated with the document. The format may comprise a representation of a two-dimensional document, or a three-dimensional document. An example of a commercially available portable document format (PDF) is the format described in "PDF Reference," sixth edition, ADOBE® Portable Document Format, Version 1.7, November 2006.

The method 311 may go on to block 323 with adding dynamic content to the data file. One or more instances of dynamic content may be added to the data file, and the addition may occur via the actions of a user, an automated system, or both. Thus, the dynamic content may be added to the data file responsive to an indication provided by a GUI, or by automated script file activity.

The method 311 may continue with receiving a comment, either from a user or an automated system at block 327. For example, the comment may be supplied using a GUI.

The method 311 may include determining the type of dynamic content (e.g., SHOCKWAVE® FLASH® object file) to which the comment pertains at block 331, and then requesting, at block 335, opaque state information that reflects the comment state selected by a user in conjunction with the comment that has previously been received. The comment state may be selected from a plurality of states associated with the dynamic content.

Some or all of the opaque state information may be requested from a rendering program associated with the determined type of dynamic content. If no information is returned, as determined at block 339, then the method may go on to end at block 361, perhaps in conjunction with presenting an error message to the user, noting that no opaque state information is available.

If opaque state information is returned, as determined at block 339, then the method 311 may include, at block 343, adding opaque state information to the data file. The opaque state information may be referenced to the comment state in the sense that various parts of the opaque state information, taken together, make up a set of data that can be used to recreate the comment state of the dynamic content (e.g., an arbitrary collection of element states 220 in FIG. 2).

The method 311 may continue on to block 347 with adding the comment to the data file, wherein the comment is associated with the opaque state information.

The method 311 may go on to send some or all of the opaque state information to a rendering program associated with the dynamic content at block 355, and continue with rendering the dynamic content in the comment state at block 359, concluding thereafter at block 361. Many other embodiments may be realized.

Figure 4:
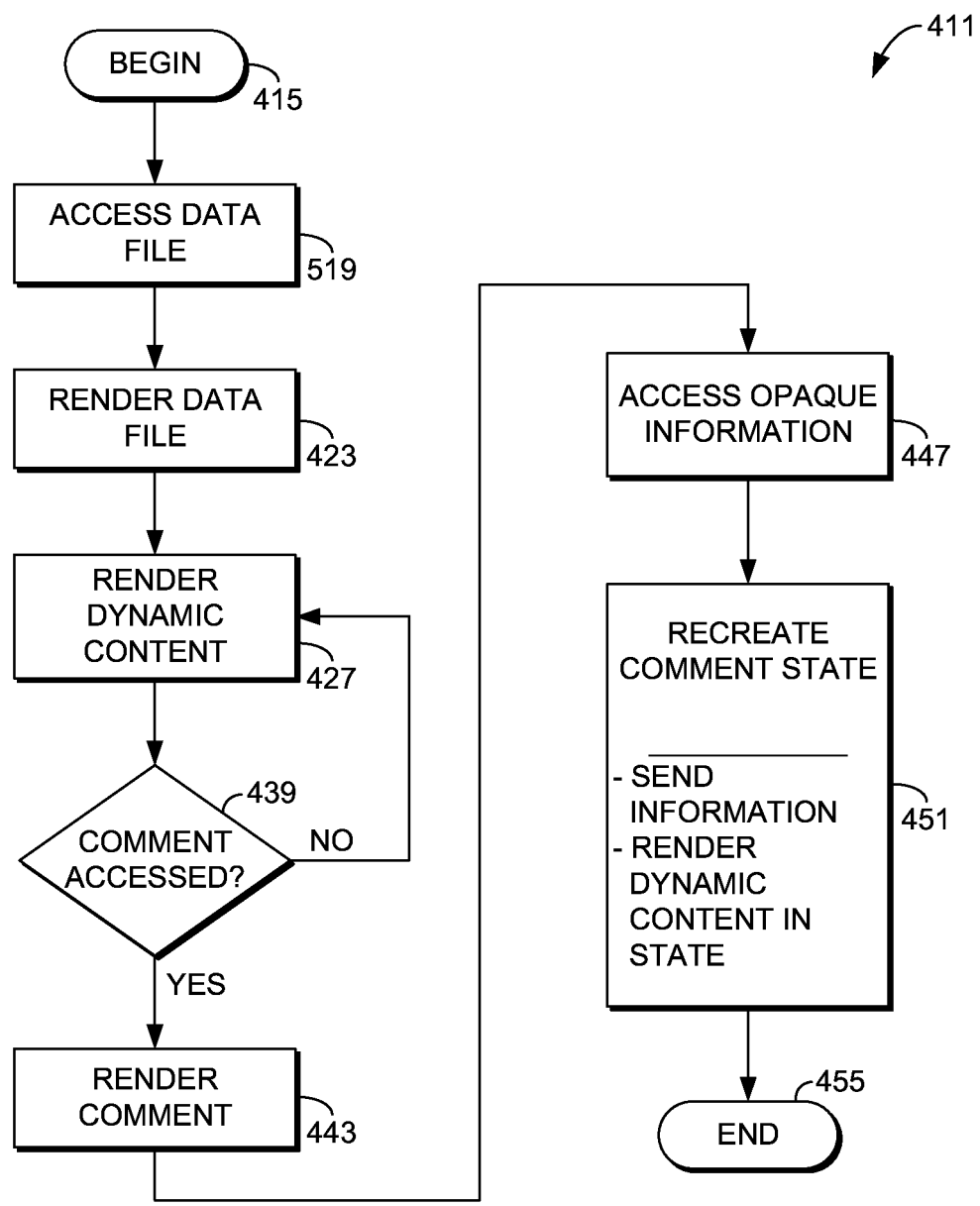
FIG. 4 is a flow diagram illustrating several additional methods according to various embodiments.

For example, FIG. 4 is a flow diagram 411 illustrating several additional methods according to various embodiments. For example, perhaps in response to receiving an indication that a comment is to be viewed by the user of a rendering module, a method 411 may begin at block 415 and continue on to block 519 with accessing a data file organized according to a page descriptive format.

The method 411 may go on to block 423 to include rendering the data file on an output device, such as a display. Some dynamic content included in the data file may be obscured due to viewport limits. If not obscured, then it may also be rendered at block 427. The dynamic content may be arranged according to a vector graphics file format, which may in turn comprise a SHOCKWAVE® FLASH® object.

If a comment has not been accessed (e.g., via selection from a GUI), as determined at block 439, then the method 311 may continue with rendering any visible dynamic content at block 427 until some indication is received that a comment is to be viewed or otherwise presented to a user. If a comment has been accessed, however, then the method 411 may continue with rendering a human-readable language statement (e.g., textual or symbolic statement) as a comment associated with a previously selected comment state.

The method 411 may continue with accessing opaque state information stored in the data file at block 447. The opaque state information is typically associated with a comment state selected from a plurality of states associated with the dynamic content. Thus, accessing the opaque state information may occur responsive to accessing one or more comments stored in the data file.

In some embodiments, accessing the opaque state information may include accessing the comment responsive to an indication provided by a GUI. That is, the comment and opaque state information may be accessed at substantially the same time, which is a different order of operations than that depicted in FIG. 4.

The method 411 may then go on to include recreating the comment state of the dynamic content using the opaque state information at block 451. Recreating the state of the dynamic content may comprise sending at least a portion of the opaque state information to a rendering program associated with the dynamic content, and rendering the dynamic content in the comment state.

The method 411 may include rendering the dynamic content in the comment state in conjunction with the comment associated with the comment state in some embodiments. The method 411 may conclude at block 455.

In some embodiments the opaque state information may be requested and provided using one or more interfaces, as noted previously. Thus, in the case of the ADOBE® FLASH® Player 9 runtime software application, a scripting interface that includes subroutine calls for "get state" and "set state" can be constructed and used to interact with the application. The get state call would be used to receive opaque state information from the application, and the set state call would be used to send opaque state information to the application. These subroutine calls might therefore be included as part of a scripting interface in a rendering module, such as ADOBE® READER® software. If the get state call is made to the application, and no opaque state information is returned within a specified amount of time, an exception error might be developed, and used to indicate that the designated dynamic content rendering program was incapable of cooperating with the rendering module to abstract information used to recreate a selected comment state.

Instead of using subroutine calls to extract opaque state information, some embodiments might employ a memory snapshot mechanism. Thus, when a comment state associated with the dynamic content is selected, the memory image associated with the dynamic content (e.g., the runtime memory of the scripting engine) might be saved for recall and rendering the dynamic content in the comment state at a later time. In most embodiments, the dynamic content can be paused to preserve the comment state while the opaque state information (perhaps comprising a memory image) is requested and stored.

It should be noted that the methods described herein do not have to be executed in the order described, or in any particular order. Moreover, various activities described with respect to the methods identified herein can be executed in iterative, repetitive, serial, or parallel fashion. Activities within various methods may also be combined, to include combination across the various figures used herein. Information, including parameters, commands, operands, and other data, can be sent and received in the form of one or more carrier waves.

Systems for Commenting Dynamic Content

Figure 5:
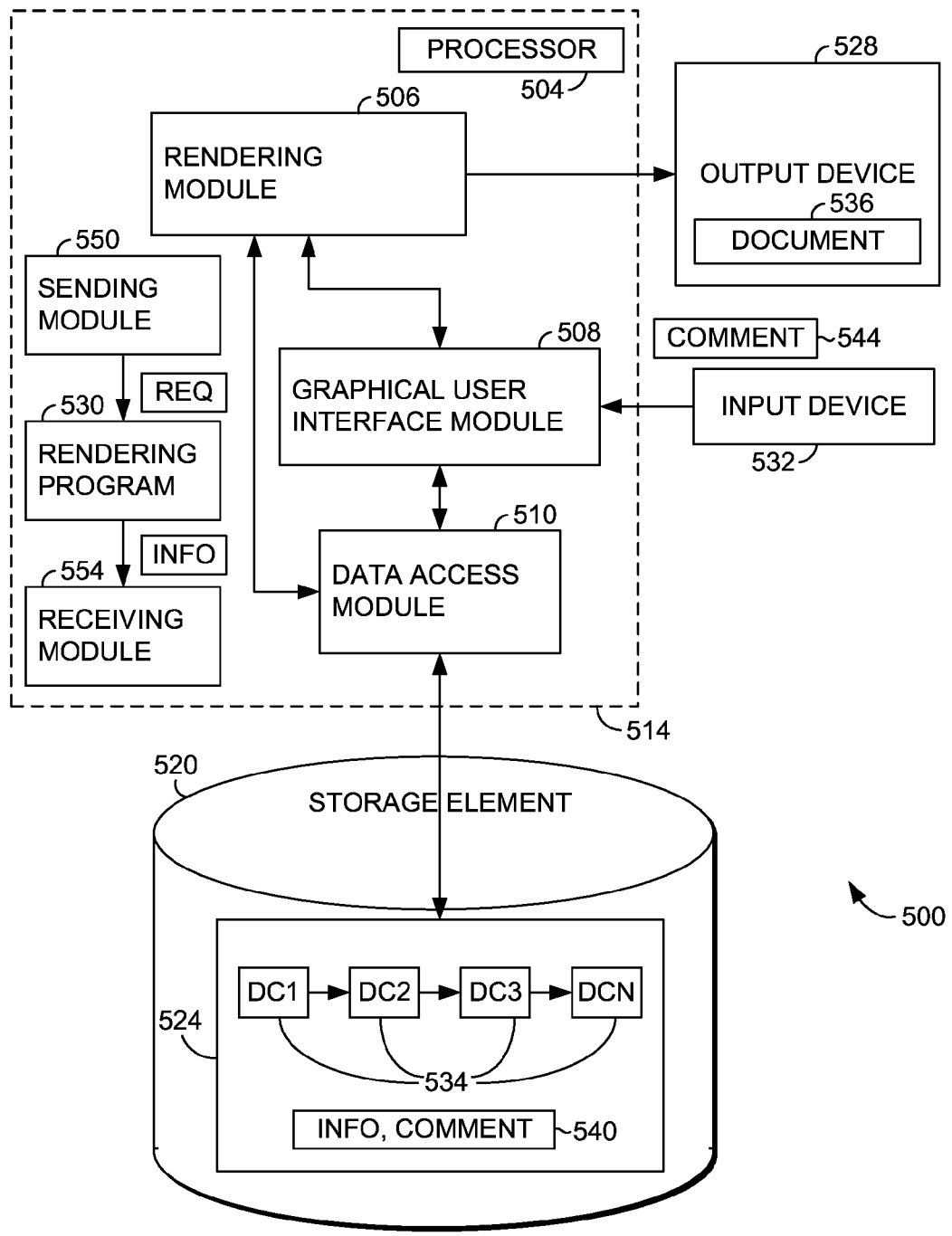
FIG. 5 is a block diagram of a system according to various embodiments.

FIG. 5 is a block diagram of a system 500 according to various embodiments. The system 500 may include a number of modules such as one or more processors 504, a rendering module 506, a GUI module 508 and a data access module 510. These modules may be associated within a machine 514, such as a personal computer, as indicated by their containment within the dashed box. In order to avoid obscuring the components of FIG. 5, interconnecting lines between each of the elements within the machine 514 have not been shown. However, those of ordinary skill in the art will understand that any of the individual elements shown to be located within the confines of the machine 514 may be operably coupled to any other element within the machine 514. Similarly, those of ordinary skill in the art will understand that any of the components shown to be located within the confines of the machine 514 may also be located outside the machine 514, and appropriately coupled to the machine 514 via wired or wireless networks.

The data access module 510 may be used by the rendering module 506 to access a storage element 520, such as a database, a memory, a disk, or other storage device. The storage element 520 may serve to contain one or more items of electronic content 524, such as electronic documents. The data access module 510 may operate to read from and/or write to the electronic content 524 and may provide reading and writing services for the benefit of other system modules, including the GUI 508, the rendering module 506, the processor 504, and the rendering program 530. The electronic content 524 may include one or more content elements 534, including dynamic content, and may also include comment and opaque state information 540.

The data access module 510 may be present in some embodiments, and absent in others. When present, the data access module 510 may operate as a mediator between the various components of the system 500 and the electronic content 524. For example, the rendering module 506 may receive data forming a part of the electronic content 524, such as opaque state information INFO by requesting and receiving the data via the data access module 510.

The rendering module 506 may be operably coupled to an output device 528, such as a display screen or loudspeaker, among others. This output device 528 may be used for presenting renderings of content elements 534. Rendering may take the form of displaying a document 536.

A GUI module 508 may be operably connected to the rendering module 506 and the data access module 510. The GUI module 508 may receive input from input devices 532, such as user input in response to the user interface presented by an electronic content reviewing application. Thus, many embodiments may be realized.

For example, a system 500 may comprise a GUI module 508 to receive a comment 544. The system 500 may further include one or more processors 504 to operate the GUI module 508, and one or more storage elements 520 to store opaque state information INFO in a data file 524 that includes dynamic content 534. The data file 524 may be organized according to a page descriptive format, and the opaque state information may be referenced to the comment and a comment state selected from a plurality of states associated with the dynamic content 534.

In some embodiments, the system 500 comprises a sending module 550 to send a request REQ for the opaque state information INFO to a rendering program 530 associated with the type of the dynamic content 534. The system 500 may also include a receiving module 554 to receive the opaque state information INFO from the rendering program 530.

In most embodiments, the system 500 comprises a rendering module 506 to render the data file 524 in the form of a document 536 on a display 528. The rendering module may comprise a portable document format processing program, such as the ADOBE® ACROBAT® portable document format processing program.

Articles for Commenting Dynamic Content

Figure 6:
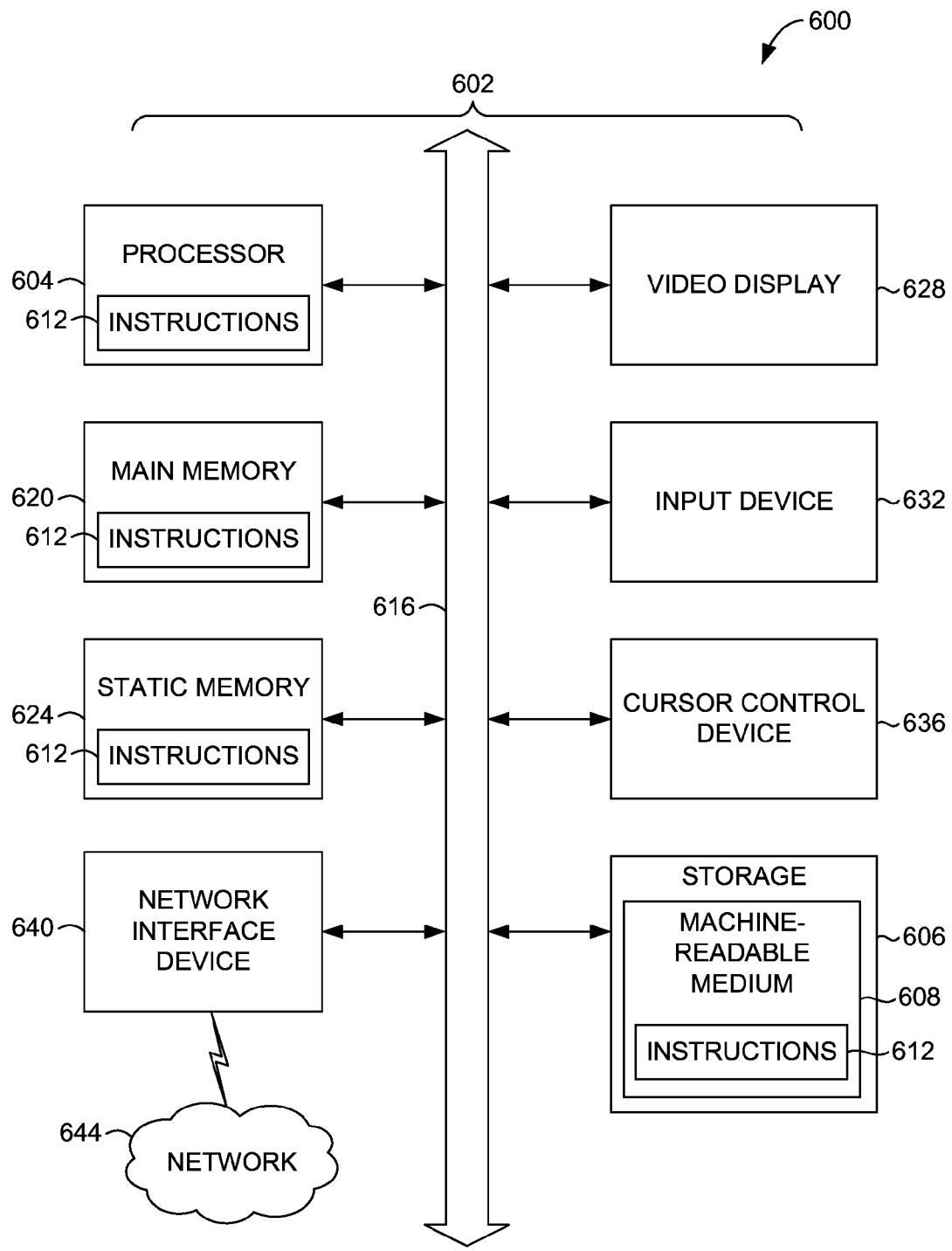
FIG. 6 is a block diagram of an article of manufacture, including a machine, according to various embodiments.

FIG. 6 is a block diagram of an article 600 of manufacture, including a machine 602, according to various embodiments. Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those of ordinary skill in the art, such as application program interfaces or inter-process communication techniques, including remote procedure calls. The teachings of various embodiments are not limited to any particular programming language or environment.

Thus, other embodiments may be realized. For example, an article of manufacture, such as a computer, a memory system, a magnetic or optical disk, some other storage device, and/or any type of electronic device or system may include one or more processors 604 coupled to a machine-readable medium 608 such as a memory (e.g., removable storage media, as well as any memory including an electrical, optical, or electromagnetic conductor) having instructions 612 stored thereon (e.g., computer program instructions), which when executed by the one or more processors 604 result in performing any of the actions described with respect to the methods above.

Machine 602 may take the form of a computer system having a processor 604 coupled to a number of components directly, and/or using a bus 616. Such components may include main memory 620, static or non-volatile memory 624, and mass storage 606. Other components coupled to the processor 604 may include an output device 628, such as a video display, an input device 632, such as a keyboard, and a cursor control device 636, such as a mouse. A network interface device 640 to couple the processor 604 and other components to a network 644 may also be coupled to the bus 616. The instructions 612 may further be transmitted or received over the network 644 via the network interface device 640 utilizing any one of a number of well-known transfer protocols (e.g., HTTP). Any of these elements coupled to the bus 616 may be absent, present singly, or present in plural numbers, depending on the specific embodiment to be realized.

The processor 604, the memories 620, 624, and the storage device 606 may each include instructions 612 which, when executed, cause the machine 602 to perform any one or more of the methods described herein. In alternative embodiments, the machine 602 operates as a standalone device or may be connected (e.g., networked) to other machines. In a networked environment, the machine 602 may operate in the capacity of a server or a client machine in server-client network environment, or as a peer machine in a peer-to-peer (or distributed) network environment. The machine 602 may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine 602 is illustrated, the term "machine" shall also be taken to include any collection of machines that individually or jointly execute a set (or multiple sets) of instructions to perform any one or more of the methodologies discussed herein.

While the machine-readable medium 608 is shown as a single medium, the term "machine-readable medium" should be taken to include a single medium or multiple media (e.g., a centralized or distributed database, and/or associated caches and servers, and or a variety of storage media, such as the processor 604 registers, memories 620, 624, and the storage device 606) that store the one or more sets of instructions 612. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to tangible media, such as solid-state memories and optical and magnetic media, and intangible media, such as carrier wave signals.

CONCLUSION

Implementing the apparatus, systems, and methods of the various embodiments may provide the ability to add comments to documents that include dynamic content with arbitrary states. One or more of the arbitrary states may be selected as a comment state referenced to opaque state information, and the opaque state information may be saved along with a comment directed to the selected comment state as part of the document data file. This functionality gives document reviewers additional capability to comment on various aspects of documents containing dynamic content, when such are provided to them for examination.

Although embodiments of the invention have been described with reference to specific example embodiments, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those of ordinary skill in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Embodiments may, for example, be implemented as a stand-alone application (e.g., without any network capabilities), a client-server application or a peer-to-peer (or distributed) application. Embodiments may also, for example, be deployed by Software-as-a-Service (SaaS), Application Service Provider (ASP), or utility computing providers, in addition to being sold or licensed via traditional channels.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of ordinary skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method comprising:
presenting a scripted dynamic content that changes state over time;
receiving an indication to associate a comment with a selected state of the scripted dynamic content, wherein the selected state is selected from a plurality of states of the scripted dynamic content, and wherein the selected state comprises user-customized content elements;
in response to receiving the indication to associate the comment with the selected state, requesting, by a first program, opaque state information for the selected state from a second program that is associated with the scripted dynamic content, wherein the opaque state information comprises frame information used by the second program to render the selected state of the scripted dynamic content;
storing the comment in association with the opaque state information for the selected state;
subsequent to storing the comment in association with the opaque state information for the selected state, receiving an indication of a request to access the comment; and
in response to receiving the indication of the request to access the comment, providing, by the first program, at least a portion of the opaque state information to the second program and rendering the comment and the selected state based on the opaque state information.

2. The method of claim 1, wherein the comment is stored in association with the opaque state information at a data file organized according to a page descriptive format, and wherein the comment and the selected state are rendered from the data file.

3. The method of claim 2, wherein the page descriptive format comprises a portable document format.

4. The method of claim 1, wherein the opaque state information further comprises at least one of the following: time information, configuration information, color information, or a data analysis result.

5. The method of claim 1, wherein the user-customized content elements comprise a content element state selected from a plurality of content element states.

6. A non-transitory computer storage media having computer-executable instructions embodied thereon that, when executed by a computing device having a processor and a memory, cause the computing device to perform a method comprising:
providing for presentation a scripted dynamic content that changes state over time;
receiving an indication to associate a comment with the selected state of the scripted dynamic content;
in response to receiving the indication to associate the comment with the selected state, requesting, by a first program, opaque state information for the selected state from a second program that is associated with the scripted dynamic content, wherein the opaque state information is used by the second program to render the selected state of the scripted dynamic content;
storing the opaque state information for the selected state;
subsequent to storing the opaque state information for the selected state, receiving an indication of a request to access the comment
in response to receiving the indication of the request to access the comment, providing, by the first program, at least a portion of the opaque state information to the second program; and
providing for presentation the comment and the selected state based on the opaque state information.

7. The computer storage media of claim 6, wherein the selected state comprises a content element that is customized based on a user input.

8. The computer storage media of claim 7, wherein the content element that is customized based on the user input comprises a content element state selected from a plurality of content element states.

9. The computer storage media of claim 6, wherein the selected state is selected from a plurality of states of the scripted dynamic content.

10. The computer storage media of claim 6, wherein the comment is stored in association with the opaque state information at an electronic document data file that is organized according to a page descriptive format.

11. The computer storage media of claim 10, wherein the page descriptive format comprises a device-independent and display resolution-independent fixed-layout document format.

12. A system comprising:
one or more hardware processors; and
one or more computer storage media storing computer-executable instructions that, when executed by the one or more processors, implement a method comprising:
receiving an indication to associate a comment with a comment state of dynamic content, wherein the comment state is selected from a plurality of states of the dynamic content,
in response to receiving the indication to associate the comment with the comment state, requesting, by a first program, opaque state information for the comment state from a second program that is associated with the dynamic content, wherein the opaque state information indicates where in the dynamic content the comment state is rendered, storing the opaque state information for the comment state, receiving an indication of a selection of the comment.

13. The system of claim 12, wherein the comment state comprises a customized content element that is customized based on a user selection of a content element state from a plurality of content element states.

14. The system of claim 13, wherein the customized content element is rendered based on the opaque state information for the comment state.

15. The system of claim 12, wherein the opaque state information for the comment state is stored in association with the comment at a data file organized according to a page descriptive format.

16. The system of claim 12, wherein the opaque state information comprises frame information that is used by the second program to render the comment state.

17. The system of claim 16, wherein the opaque state information further comprises at least one of the following: time information, configuration information, color information, or a data analysis result.

18. The system of claim 12, wherein at least one of a format or values of the opaque state information is unrecognizable by the first program.

19. The method of claim 1, wherein at least one of a format or values of the opaque state information is unrecognizable by the first program.

20. The method of claim 1, wherein the selected state is rendered by the second program based on the opaque state information provided by the first program.

* * * * *